US008464207B2

(12) United States Patent
Pouliot

(10) Patent No.: US 8,464,207 B2
(45) Date of Patent: Jun. 11, 2013

(54) SYSTEM AND METHOD FOR TRACKING SOFTWARE CHANGES

(75) Inventor: Sebastien Pouliot, Beauport (CA)

(73) Assignee: Novell Intellectual Property Holdings, Inc., Seattle, WA (US)

( * ) Notice: Subject to any disclaimer, the term of this patent is extended or adjusted under 35 U.S.C. 154(b) by 1119 days.

(21) Appl. No.: 11/907,498

(22) Filed: Oct. 12, 2007

(65) Prior Publication Data

US 2009/0100410 A1 Apr. 16, 2009

(51) Int. Cl.
*G06F 9/44* (2006.01)

(52) U.S. Cl.
USPC ............ 717/104; 717/101; 717/102; 717/120

(58) Field of Classification Search
None
See application file for complete search history.

(56) References Cited

U.S. PATENT DOCUMENTS

| | | | | |
|---|---|---|---|---|
| 6,601,233 | B1* | 7/2003 | Underwood | 717/102 |
| 7,069,547 | B2* | 6/2006 | Glaser | 717/154 |
| 7,519,953 | B2* | 4/2009 | Reissman et al. | 717/124 |
| 7,703,027 | B2* | 4/2010 | Hsu et al. | 715/763 |
| 7,836,440 | B2* | 11/2010 | Blackman et al. | 717/166 |
| 2004/0034848 | A1* | 2/2004 | Moore et al. | 717/117 |
| 2005/0071818 | A1* | 3/2005 | Reissman et al. | 717/127 |
| 2006/0150153 | A1* | 7/2006 | Altman | 717/116 |
| 2006/0242550 | A1* | 10/2006 | Rahman et al. | 715/500.1 |
| 2006/0288344 | A1* | 12/2006 | Brodersen et al. | 717/168 |
| 2007/0006130 | A1* | 1/2007 | Stamler et al. | 717/104 |
| 2007/0100854 | A1* | 5/2007 | Lain et al. | 707/100 |
| 2007/0204257 | A1* | 8/2007 | Kinno et al. | 717/100 |
| 2007/0234278 | A1* | 10/2007 | Damm et al. | 717/104 |
| 2007/0256069 | A1* | 11/2007 | Blackman et al. | 717/170 |
| 2007/0283322 | A1* | 12/2007 | Hsu et al. | 717/113 |
| 2008/0120598 | A1* | 5/2008 | Imeshev | 717/120 |
| 2009/0070733 | A1* | 3/2009 | Huang et al. | 717/101 |
| 2009/0070734 | A1* | 3/2009 | Dixon et al. | 717/102 |
| 2009/0100405 | A1* | 4/2009 | Belenky et al. | 717/104 |
| 2009/0228865 | A1* | 9/2009 | De Becdelievre et al. | 717/106 |
| 2010/0162200 | A1* | 6/2010 | Kamiyama et al. | 717/101 |
| 2010/0313188 | A1* | 12/2010 | Asipov et al. | 717/139 |

OTHER PUBLICATIONS

Audris Mockus et al., "Identifying Reasons for Software Changes Using Historic Databases", 2000 IEEE, pp. 120-130, <http://ieeexplore.ieee.org/stamp/stamp.jsp?tp=&arnumber=883028>.*

Todd L. Graves et al., "Predicting Fault Incidence Using Software Change History", Jul. 2000 IEEE, pp. 653-661, <http://ieeexplore.ieee.org/stamp/stamp.jsp?tp=&arnumber=859533>.*

(Continued)

*Primary Examiner* — Thuy Dao
*Assistant Examiner* — Cuong V Luu
(74) *Attorney, Agent, or Firm* — Pillsbury Winthrop Shaw Pittman LLP

(57) ABSTRACT

A system and method may be used to track software changes by analyzing intermediate language level representations of the software. For example, software changes may be tracked by analyzing object-oriented program code that includes one or more non-native binary executables based on an intermediate language. The program code may be associated with metadata describing content of the non-native binary executables. An object tree, which includes a plurality of nodes, may be constructed to represent the non-native binary executables and the metadata describing the content of the non-native binary executables. One or more of the plurality of nodes may be hashed to associate respective digest values with the hashed nodes, such that changes in the received program code can be tracked using the digest values associated with the hashed nodes.

33 Claims, 3 Drawing Sheets

OTHER PUBLICATIONS

Gail C. Murphy et al., "Predicting Source Code Changes by Mining Change History", Sep. 2004 IEEE, pp. 574-586, <http://ieeexplore.ieee.org/stamp/stamp.jsp?tp=&arnumber=1324645>.*

Shawn A. Bohner et al., "Impact Analysis in the Software Change Process: A Year 2000 Perspective", 1996 IEEE, pp. 42-51, <http://ieeexplore.ieee.org/stamp/stamp.jsp?tp=&arnumber=564987>.*

Anthony MacDonald et al., "SubCM: A Tool for Improved Visibility of Software Change in an Industrial Setting", Oct. 2004 IEEE, pp. 675-693, <http://ieeexplore.ieee.org/stamp/stamp.jsp?tp=&arnumber=1339278>.*

W. Lam et al., "Managing Change in Software Development Using a Process Improvement Approach", 1998 IEEE, pp. 779-786, <http://ieeexplore.ieee.org/stamp/stamp.jsp?tp=&arnumber=708102>.*

"Standard ECMA-335: Common Language Infrastructure (CLI) Partitions I to VI", 4$^{th}$ Edition, published Jun. 2006, 556 pages.

* cited by examiner

SYSTEM AND METHOD FOR TRACKING SOFTWARE CHANGES

FIELD OF THE INVENTION

The invention relates to a system and method for tracking software changes by analyzing intermediate language (IL) level representations of the software, and in particular, to providing software quality assurance by analyzing the tracked software changes.

BACKGROUND OF THE INVENTION

Software applications can be subject to various security vulnerabilities, such that inadequately designed or written source code can allow attackers to threaten privacy, steal data, or present other security concerns. For example, an insecure web application could potentially expose vital data to the World Wide Web, which may result in unauthorized access to confidential information. Moreover, software applications may be subject to many intrinsic vulnerabilities, including memory leaks that cause application crashes or instability, improperly formulated function calls that cause incorrect or inconsistent data, or other vulnerabilities. As a result, effectively auditing software to identify and rectify vulnerabilities can significantly improve enterprise security and application performance, or provide other quality assurance advantages. Thus, software audits may often be needed to address various operational risks posed by vulnerable software, in addition to being required for compliance with mandatory regulations and policies that govern data privacy, integrity, and good corporate governance.

Unfortunately, existing techniques for auditing software tend to be based upon "snap shots" taken at singular points during the lifecycle. By auditing a "snap shot" of code likely to change many times prior to (or after) release, results of an audit may only be meaningful for severely limited amounts of time. For instance, during development of any given software application, engineers may often modify source code associated with the application to resolve bugs, add features, improve efficiency, or otherwise contribute to application development. Furthermore, in response to changing user needs, system capabilities, design choices, or other factors, software vendors may release new or updated versions of an application at various points in time. Thus, software application lifecycles can often include several revisions, rewrites, or other modifications to source code associated with a given application. Thus, because audit information can become stale or meaningless in response to any given code modification, "snap shot" audits tend to become unrepresentative of a current code base soon after the audits have occurred, thus necessitating scheduling of a new audit that will also be subject to similar limitations. As a result, using existing software audit techniques, an audit's value or longevity depends primarily on how frequently audits occur. Considering the high investment costs associated with performing audits (e.g., in terms of time, money, or other factors), coupled with a general lack of enthusiasm to perform audits, lengthening a validity period associated with a software audit can offer significant advantages over existing systems.

Furthermore, analyzing a "snap shot" of a software application can present obstacles to debugging software, optimizing performance, or performing other quality assurance tasks. Thus, instead of analyzing static representations of software, various systems have been developed that can track changes made in software at multiple points in the software lifecycle (e.g., based on dates, versions, etc.). However, existing techniques for tracking the software changes tend to be performed either at a source code level, or at a native binary executable level, both of which have significant inconveniences and limitations that can prevent effective judgments of what constitutes an important change in the software.

For example, tracking changes to source code may appear to have simplicity advantages (e.g., where differences between two source files can be identified using a file comparison utility, such as diff). However, results produced thereby tend to have limited utility, as simple comparisons of source code can potentially yield excessive, useless, or meaningless results (e.g., changes to comments, variable names, pre-processor directives, code that will not be compiled or utilized in a final executable, etc.). Furthermore, the results may be imprecise because comparison tools may not necessarily be aware of rules governing a programming language in which the source code was written (e.g., in C#, changing a type definition from struct to class may appear minor, source wise, but an impact of the change may be significant). Even when language parsers or other tools can obtain better results, the tools tend to lack "simpler" change detection mechanisms, instead focusing on detecting issues with the software (e.g., eliminating infinite loops, dereferencing NULL pointers, etc.).

Furthermore, tracking changes to native binary executables tends to be relatively uncommon, though hackers routinely use such techniques to reverse engineer patches. However, by the time that source code has been compiled into the native binary executables, a significant amount of useful tracking information may be lost. In addition, binary executables may differ significantly from original source code due to compiler optimizations (e.g., inlining, constant propagation, loop unrolling, dead code elimination, etc.) that can eliminate code segments, render redundant code non-functional, or otherwise optimize functional aspects of source code. Furthermore, binary executables tend to be generated for specific platforms or processing architectures, limiting a relevance of any identified changes to the platform or architecture for which the executables were prepared.

Existing systems suffer from these and other problems.

SUMMARY OF THE INVENTION

According to various aspects of the invention, a system and method for tracking software changes may address these and other drawbacks of existing systems. For example, the invention can effectively track and recognize similarities and differences between different versions of a software application. As a result, the invention can be used to easily analyze changes between subsequent source code releases, to pinpoint bugs or other issues with the software, to streamline audit procedures, to reduce an amount of time needed to perform audits, and/or to increase a validity period of audits, among other quality assurance advantages.

According to various aspects of the invention, a system and method may be used to track software changes by analyzing intermediate language (IL) level representations of the software. For example, software changes may be tracked by analyzing object-oriented program code that includes one or more non-native binary executables based on an intermediate language. The program code may be associated with metadata describing content of the non-native binary executables. An object tree, which includes a plurality of nodes, may be constructed to represent the non-native binary executables and the metadata describing the content of the non-native binary executables. One or more of the plurality of nodes may be hashed to associate respective digest values with the hashed nodes, such that changes in the received program code can be tracked using the digest values associated with the hashed nodes.

According to various aspects of the invention, changes in software may be tracked by determining when changes occur in an intermediate language representation of the software. For example, the software may include program code based on an intermediate language (e.g., Common Intermediate Language bytecode, Java bytecode, etc.), and the program code may be associated with descriptive metadata that describes content of one or more non-native binary executables and one or more resources (e.g., files, images, etc.) associated with the program code. As such, tracking changes to the received program code may include, among other things, constructing an object tree to represent various elements associated with the non-native binary executables (e.g., one or more assemblies may contain one or more modules, which may contain one or more types, which may contain one or more sub-types or methods, etc.). The object tree may also represent the resources associated with the program code and the metadata describing the content of the various elements and the resources. Each leaf node in the object tree may be assigned a digest value, determined based on a hash of the contents associated with a respective one of the leaf nodes. Further, one or more of the internal nodes may be assigned a digest value based on digest values associated with leaf nodes identified as children of a respective one of the internal nodes. Alternatively, or in combination, one or more of the internal nodes may be associated with a change flag that takes a value of 'one' when a digest value associated with any one of the children changes. As such, changes in the intermediate language representation can be precisely identified by determining when changes occur in one or more digest values or change flags, identifying nodes associated with the determined changes, and identifying which aspects of the intermediate language representation correspond to the identified nodes.

Other objects and advantages of the invention will be apparent to those skilled in the art based on the following drawings and detailed description.

DETAILED DESCRIPTION

Figure 1A:
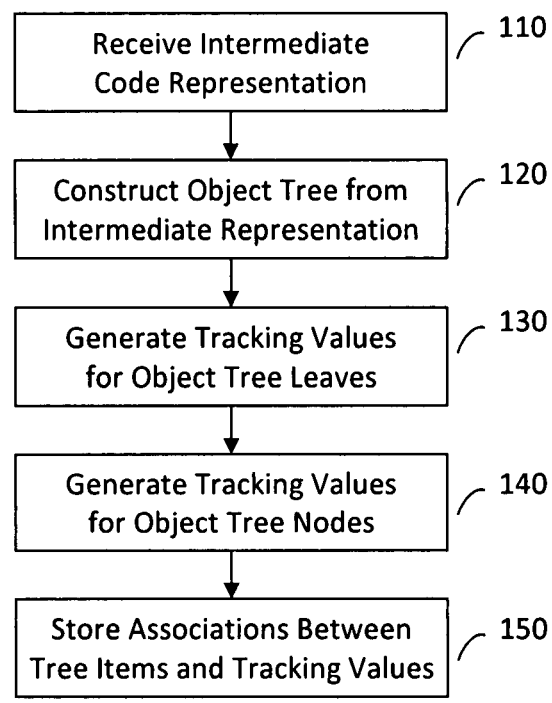
FIG. 1a illustrates a flow diagram of an exemplary method for tracking software changes by generating intermediate language level representations of the software according to various aspects of the invention.

According to various aspects of the invention, FIG. 1a illustrates a flow diagram of an exemplary method for tracking software changes by using intermediate language level representations of the software. Using the techniques described herein, data associated with software that can be represented in an intermediate language may be analyzed to precisely detect where changes have occurred in the software.

The method for tracking software changes may begin in an operation 110, in which software represented using an intermediate code format may be received for further processing.

The intermediate code format may be based on any suitable source code translation, from which native object code can subsequently be generated. For example, in various implementations, the intermediate code representation received in operation 110 may include language-independent, platform-independent bytecode generated by a compiler. The compiler may be associated with a Microsoft .NET development platform, which includes a standardized Common Language Infrastructure (CLI), as defined by International Standard ECMA-335. As a result, the language-independent, platform-independent bytecode may include a Common Intermediate Language (CIL) translation of source code written in any suitable .NET programming language (e.g., C#, VB.NET, J#, IronPython, etc.), or any other programming language which can be compiled in accordance with the CIL instruction set.

Thus, the intermediate code representation received in operation 110 can include output generated by a compiler that analyzes incoming source code to produce one or more assemblies that contain CIL bytecode, in addition to structured metadata that contains descriptive information relating to the bytecode. The metadata may describe and/or reference the CIL bytecode, and may be created independently of any particular programming language. Thus, the metadata provides a common interchange mechanism that can be used between various tools that manipulate program code (e.g., compilers, debuggers, etc.).

The intermediate code representation may be included within one or more files that store assemblies, which serve as containers for intermediate language code and metadata describing the intermediate language code (files having .exe extensions may store assemblies containing a starting point for executing an application, while files having .dll extensions may store assemblies containing class libraries). The assemblies can be considered similar to Java .class files, where source code can be compiled into intermediate bytecode for further analysis. Subsequent to the analysis, which will be described in greater detail below, the intermediate bytecode may be compiled into native machine code for execution (e.g., using a Common Language Runtime).

Additional information relating to the assemblies, the Common Intermediate Language (CIL) bytecode, the associated metadata, and the Common Language Infrastructure (CLI), among other things, will be apparent based on the descriptions provided in "Standard ECMA-335: Common Language Infrastructure (CLI) Partitions I to VI," 4th Edition, published June 2006, the contents of which are hereby incorporated by reference in their entirety.

The intermediate code representation, including the one or more assemblies received in operation 110, may subsequently be decomposed in an operation 120, which includes constructing an object tree from the intermediate representation. For example, as described above, the assemblies may include intermediate language bytecode, in addition to descriptive metadata associated with the bytecode. As a result, any given assembly may include associated metadata, one or more executables (e.g., modules containing defined types and sub-types), and one or more resources (e.g., files, images, etc.). Each of the executables and resources, in turn, may include associated metadata. Furthermore, types (and sub-types) can have their own metadata definitions, and can contain one or more methods (e.g., subroutines). The methods, in turn, can also have their own metadata definitions, in addition to intermediate language bytecode. Thus, a method may be further decomposed into an intermediate language tree that represents a call graph associated with the method. Thus, in an exemplary illustration, the object tree constructed in operation 120 may be based on any suitable data structure capable of representing relationships between various assembly components. Each of the assemblies may be organized hierarchically, such that the assemblies can be incorporated into the object tree in a way that suitably represents the hierarchical organization. For example, operation 120 may include constructing an object tree from one or more assemblies, which have been decomposed as follows:

```
I. Assembly
    A. Assembly Metadata
    B. Modules
        1. Modules Metadata
        2. Types
            a. Type Metadata
            b. Sub-Types
                i. Sub-Types Metadata
                ...
            c. Methods
                i. Method Metadata
                ii. Method Intermediate Language
                ...
    C. Resources
        1. Files
        2. Images
            ...
```

Figure 1B:
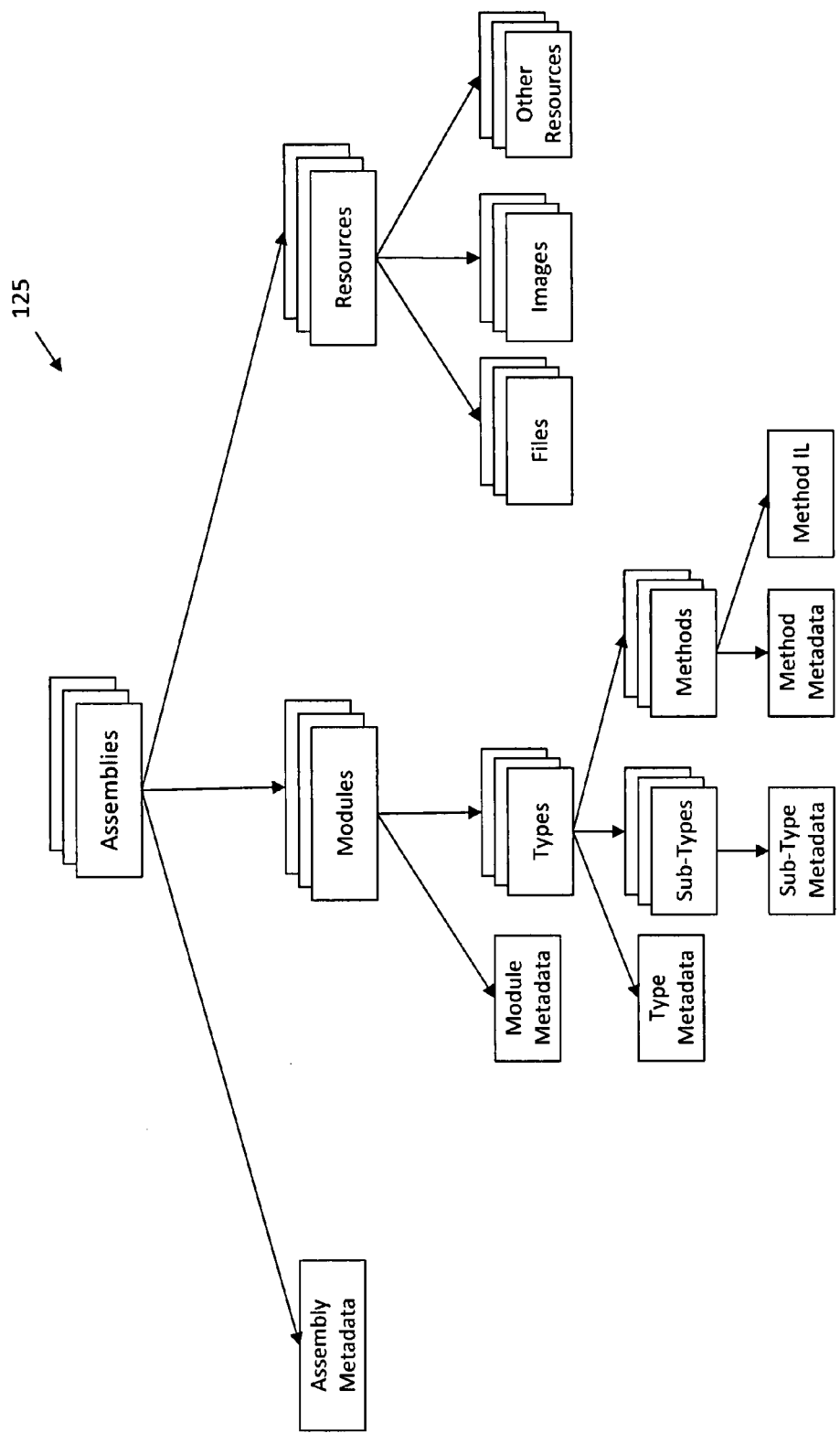
FIG. 1b illustrates a block diagram of an exemplary data structure for representing software at an intermediate language level according to various aspects of the invention.

Thus, referring to FIG. 1b, an object tree 125 may be constructed in operation 120 to represent a decomposed assembly. As will be apparent, the object tree 125 includes a plurality of linked nodes, which can contain values, additional data structures, or sub-trees (e.g., such as the tree representing a method's intermediate language call graph), or other information. The object tree represents the assembly as a root node, which includes child nodes for metadata, modules, and resources associated with the metadata. The modules and resource nodes may also include one or more child nodes, and hierarchical relationships may continue to be represented in this manner until every element in the assembly has been represented in the object tree. Although FIG. 1b illustrates an object tree based on ECMA/CLI assemblies, it will be apparent that other intermediate languages may be represented using similar techniques. For example, the specific relationships between objects may differ from one intermediate language to another, in which case the object tree 125 may be modified in a way that accounts for the relationships of the intermediate language being represented by the object tree 125.

Furthermore, in various implementations, a depth associated with the object tree can be varied to account for a tradeoff between processing speed and quality. For instance, operation 120 may be varied depending on whether speed or precision of comparisons provides a higher value. Thus, when speed provides the higher value (e.g., in a large software project in which the object tree may contain a very large number of nodes), the object tree may not necessarily contain the intermediate language tree representing a method's intermediate language call graph. Alternatively, when precision provides the higher value (e.g., when performing an in-depth security audit), the object tree may contain the intermediate language tree to provide greater visibility into the assembly. Further still, the speed/precision tradeoff may be considered in various other ways, where the depth of the tree may be reduced to improve processing speed, increased to improve precision, or various combinations thereof, as appropriate for any given circumstance.

When construction of the object tree has completed, each node in the object tree that does not have a child node (i.e., leaf nodes) may be assigned a tracking value, as generated in an operation 130. For example, the tracking value may be generated for a given leaf node by hashing information associated with the node to produce a digest value. The digest value may be generated using cryptographic mechanisms that produce hashed or encoded values that can represent contents of the node in existence when the hashing occurred. Thus, the digest values used to track leaf node contents will change upon the contents of the leaf node changing. Thereafter, an operation 140 may include generating tracking values for remaining nodes in the object tree (i.e., internal nodes, which have child nodes). The tracking value for any given internal node may also be a digest value, which can be based on digest values associated with children of the internal node. Alternatively, in various implementations, the tracking value for an internal node may be a simple "change" flag that alternates between zero and one (e.g., where zero indicates that none of the digest values associated with the node's children have changed, and one indicates that at least one digest value associated with the node's children has changed). For example, when a digest value associated with the executable metadata leaf node changes, a flag associated with the executable internal node may be set to 'one' to indicate that data associated with the executable internal node may be out-of-date.

Thus, when tracking values have been assigned to each node in the object tree, associations between nodes and the tracking values may be stored into a file in an operation 150. Furthermore, the processing described in FIG. 1 may be applied to other intermediate code representations (e.g., previous or subsequent versions of an assembly), such that various different files can include associations between digest values and nodes in the object tree, which may represent distinct versions of an assembly. As a result, the associations from two or more files can be compared (e.g., manually or using a comparison tool) to detect, very precisely, if and where any changes occurred in the assembly.

Figure 2:
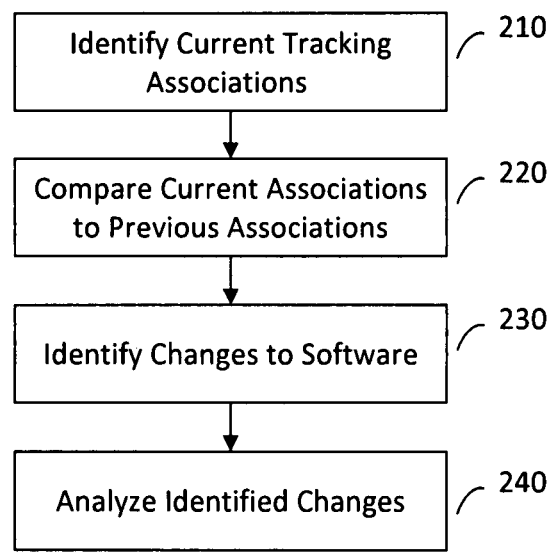
FIG. 2 illustrates a flow diagram of an exemplary method for providing software quality assurance by analyzing intermediate language level representations of the software according to various aspects of the invention.

For example, according to various aspects of the invention, FIG. 2 illustrates a flow diagram of an exemplary method for providing software quality assurance by analyzing intermediate language level representations of the software. In an operation 210, current associations between tracking values and elements of an intermediate language representation of software may be identified. For example, the currently identified associations may be stored in a file that includes associations between nodes in an object tree and one or more digest values, status change flags, or other tracking values associated with the nodes. The nodes may be based on a decomposition of assembly represented in intermediate language bytecode, as described in greater detail in connection with FIG. 1.

Subsequently, the intermediate language representation of the software may be analyzed to determine which aspects of the software, if any, have changed with respect to one or more previous versions of the software. Thus, an operation 220 may include identifying tracking values associated with object trees that represent the one or more previous versions. Based on a comparison of the tracking values between the various versions, a subsequent operation 230 may determine which aspects of the current version of the software have changed with respect to the previous versions.

Because the comparison occurs at an intermediate language level, identified changes may be limited to those changes that affect system operation (e.g., source code changes to comments, variable names, or other aspects of the code that do not affect fundamental operations would be discarded when the source code was compiled into the intermediate language representation). Furthermore, the intermediate language representation can subsequently be compiled for many different platforms (e.g., Java bytecode can be executed on a Java Virtual Machine by performing Just-in-Time compilation at runtime). Thus, the changes identified in operation 230 will have relevance to any platform or architecture on which the intermediate language representation can be compiled into native machine code for execution.

Thus, an operation 240 may analyze the identified changes to provide various measures of quality assurance. For example, when used in connection with a source code audit, the source code being audited can be compiled into intermediate language code and analyzed and/or compared to previous releases or versions of the intermediate language code. As successive releases or versions may often include incremental changes, the analysis performed in operation 240 may be advantageous in identifying which portions of the source code have changed in a way that affects a system. Thus, by tracking changes at the intermediate language level, increased visibility can be provided to define the portions of the source code in need of auditing, which can significantly reduce an amount of investment time necessary to update previous audits (e.g., a previous "snap shot" audit may remain meaningful by auditing the changed portions of the code, and the increased visibility may drastically reduce an amount of data to audit by specifically identifying the portions affecting system operation).

Although the above-described techniques for tracking software changes have been specifically described in connection with technologies associated with International Standard EMCA-335 (e.g., Common Language Infrastructure, Common Intermediate Language, etc.), the inventive concepts may be applied to any program code representation based on an intermediate language (e.g., Java bytecode targeting a Java Virtual Machine, Register Transfer Language code targeting a GNU compiler, etc.). As a result, changes in software can be precisely tracked independently of which programming language was used to write source code associated with the software, and independently of which platform or architecture will execute object code associated with the software.

Furthermore, although the above-described techniques have been illustrated as having value in performing software audits, it will be apparent that the inventive concepts may be used in any circumstance where visibility or precision of identifying important changes in software may be desired. For example, changes to an intermediate language level representation of software may be tracked to audit future source code releases (e.g., one or more baselines may be established for a software release, such as a beta version, and future versions may be compared to the baseline). In another example, changes can be tracked to identify how different compilers (e.g., different versions of a compiler, or compilers developed by different vendors) diverge in generating intermediate language representations of source code (e.g., to provide assurance to a developer that changing compilers will only differ in their output as expected). In still another example, new or existing software quality assurance tools may be designed to take advantage of the inventive concepts described herein (e.g., tools may be developed to detect a change that produced an error that did not previously exist, or to produce new software metrics or statistical measures of quality assurance).

Furthermore, implementations of the invention may be made in hardware, firmware, software, or any suitable combination thereof. The invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described in the above disclosure in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Aspects and implementations may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A method for tracking software changes, comprising:
receiving an assembly that comprises intermediate language bytecode, and one or more components that comprise or reference the intermediate language bytecode;
decomposing the assembly to identify one or more hierarchical relationships among the one or more components that comprise or reference the intermediate language bytecode;
constructing an object tree that represents the decomposed assembly, wherein constructing the object tree includes:
 creating a root node to represent the decomposed assembly;
 creating one or more internal nodes to represent the one or more components that comprises or reference the intermediate language bytecode;
 creating a first set of one or more leaf nodes that comprises or references the intermediate language bytecode;
 creating a second set of one or more leaf nodes that comprises metadata describing the intermediate language bytecode; and
 linking the root node, the one or more internal nodes, and the first set and second set of one or more leaf nodes in the object tree to represent the hierarchical relationships among the one or more components that comprise or reference the intermediate language bytecode;
hashing the intermediate language bytecode in or referenced by the first set of one or more leaf nodes in the object tree to produce one or more digest values that represent hashed contents of the first set of one or more leaf nodes; and
tracking the one or more digest values to determine whether the intermediate language bytecode in the assembly has changed.

2. The method of claim 1, further comprising:
assigning one or more tracking values to the root node and the one or more internal nodes in the object tree based on the hierarchical relationships represented in the object tree and the one or more digest values that represent the hashed contents of the first set of one or more leaf nodes;

detecting the one or more changes associated with the decomposed assembly in response to determining that the one or more digest values of the first set of one or more leaf nodes have changed; and identifying where the decomposed assembly has changed based on the one or more digest values and the one or more tracking values.

3. The method of claim 1, wherein the one or more internal nodes further represent one or more resources associated with the decomposed assembly and the second set of one or more leaf nodes further represent metadata that describes the one or more resources associated with the decomposed assembly.

4. The method of claim 3, further comprising:

assigning tracking values to the root node and the one or more internal nodes in the object tree based on the hierarchical relationships represented in the object tree and the one or more digest values that represent the hashed contents associated with the first set of one or more leaf nodes; and detecting the one or more changes associated with the decomposed assembly in response to determining that the tracking values assigned to the root node or the one or more internal nodes have changed.

5. The method of claim 1, wherein a cryptographic hash function produces the one or more digest values that represent the hashed contents associated with the first set of one or more leaf nodes.

6. The method of claim 1, wherein the intermediate language bytecode in the received assembly includes Common Intermediate Language bytecode or translated source code that can be compiled into native machine code executable in a runtime environment.

7. The method of claim 1, wherein the one or more internal nodes represent one or more modules, one or more types contained within the one or more modules, or one or more methods contained within the one or more types, and wherein the first set of one or more leaf nodes comprise intermediate language bytecode used by the one or more methods, types, or modules.

8. The method of claim 7, wherein the root node, the one or more internal nodes, and the first set and second set of one or more leaf nodes linked in the object tree further represent the hierarchical relationships among the decomposed assembly, the metadata, the intermediate language bytecode, and the one or more modules, the one or more types, or the one or more methods.

9. The method of claim 8, wherein the decomposed assembly further comprises one or more resources and the one or more internal nodes further represent the one or more resources in the decomposed assembly.

10. The method of claim 4, wherein assigning the one or more tracking values to the root node and the one or more internal nodes includes:

determining, for each internal node having a leaf node, whether content of the leaf node of the internal node has changed, wherein the determining is based on a digest value produced from hashing content of the leaf node;

assigning, to each internal node having a leaf node, a tracking value indicative of change if content of the leaf node was determined to have changed;

assigning, to the root node, the tracking value indicative of change if one of the one or more internal nodes was assigned the tracking value indicative of change.

11. The method of claim 7, wherein constructing the object tree further includes:

decomposing the intermediate language bytecode in the first set of one or more leaf nodes into a call graph associated with the one or more methods that use the intermediate language bytecode;

creating a sub-tree to represent the call graph associated with the one or more methods; and linking the first set of one or more leaf nodes that comprise the decomposed intermediate language bytecode to the sub-tree that represents the call graph associated with the one or more methods.

12. A computer readable storage medium storing computer executable instructions for tracking software changes, wherein executing the computer executable instructions on a computer causes the computer to:

receive an assembly that comprises intermediate language bytecode, and one or more components that comprise or reference the intermediate language bytecode;

decompose the assembly to identify one or more hierarchical relationships among the one or more components that comprise or reference the intermediate language bytecode;

create a root node to represent the decomposed assembly;

create one or more internal nodes to represent the one or more components that comprise or reference the intermediate language bytecode;

create a first set of one or more leaf nodes that comprises or references the intermediate language bytecode;

create a second set of one or more leaf nodes that comprises metadata describing the intermediate language bytecode;

link the root node, the one or more internal nodes, and the first set and second set of one or more leaf nodes to construct an object tree to represent the hierarchical relationships among the one or more components that comprise or reference the intermediate language bytecode;

hash the intermediate language bytecode in or referenced by the first set of one or more leaf nodes in the object tree to produce one or more digest values that represent hashed contents of the first set of one or more leaf nodes; and track the one or more digest values to determine whether the intermediate language bytecode in the assembly has changed.

13. The computer readable storage medium of claim 12, wherein executing the computer executable instructions on the computer further causes the computer to:

assign one or more tracking values to the root node and the one or more internal nodes in the object tree based on the hierarchical relationships represented in the object tree and the one or more digest values that represent the hashed contents of the first set of one or more leaf nodes;

detect the one or more changes associated with the decomposed assembly if the one or more digest values of the first set of one or more leaf nodes have changed; and identify where the decomposed assembly has changed based on the one or more digest values and the one or more tracking values.

14. The computer readable storage medium of claim 12, wherein the one or more internal nodes further represent one or more resources associated with the decomposed assembly and the second set of one or more leaf nodes further represent metadata that describes the one or more resources associated with the decomposed assembly.

15. The computer readable storage medium of claim 14, wherein executing the computer executable instructions on the computer further causes the computer to:

assign tracking values to the root node and the one or more internal nodes in the object tree based on the hierarchical relationships represented in the object tree and the one or more digest values that represent the hashed contents associated with the first set of one or more leaf nodes; and detect the one or more changes associated with the decomposed assembly if the tracking values assigned to the root node or the one or more internal nodes have changed.

16. The computer readable storage medium of claim 12, wherein the computer executable instructions include a cryptographic hash function to produce the one or more digest values that represent the hashed contents associated with the first set of one or more leaf nodes.

17. The computer readable storage medium of claim 12, wherein the intermediate language bytecode in the received assembly includes Common Intermediate Language bytecode or translated source code that can be compiled into native machine code executable in a runtime environment.

18. The computer readable storage medium of claim 12, wherein the one or more internal nodes represent one or more modules, one or more types contained within the one or more modules, or one or more methods contained within the one or more types and wherein the first set of one or more leaf nodes contain intermediate language bytecode used by the one or more methods, types, or modules.

19. The computer readable storage medium of claim 18, wherein the root node, the one or more internal nodes, and the first set and second set of one or more leaf nodes linked in the object tree further represent the hierarchical relationships among the decomposed assembly, the metadata, the intermediate language bytecode, and the one or more modules, the one or more types, or the one or more methods.

20. The computer readable storage medium of claim 19, wherein the decomposed assembly further comprises one or more resources and the one or more internal nodes further represent the one or more resources in the decomposed assembly.

21. The computer readable storage medium of claim 15, wherein executing the computer executable instructions on the computer further causes the computer to:

determine, for each internal node having a leaf node, whether content of the leaf node of the internal node has changed, wherein the determining is based on a digest value produced from hashing content of the leaf node;

assign, to each internal node having a leaf node, a tracking value indicative of change if content of the leaf node was determined to have changed;

assign, to the root node, the tracking value indicative of change if one of the one or more internal nodes was assigned the tracking value indicative of change.

22. The computer readable storage medium of claim 18, wherein executing the computer executable instructions on the computer further causes the computer to:

decompose the intermediate language bytecode in the first set of one or more leaf nodes into a call graph associated with the one or more methods that use the intermediate language bytecode;

create a sub-tree to represent the call graph associated with the one or more methods; and link the first set of one or more leaf nodes that comprise the decomposed intermediate language bytecode to the sub-tree created to represent the call graph associated with the one or more methods.

23. A system for tracking software changes, wherein the system comprises one or more processing devices configured to:

receive an assembly that comprises intermediate language bytecode, and one or more components that comprise or reference the intermediate language bytecode;

decompose the assembly to identify one or more hierarchical relationships among the one or more components that comprise or reference the intermediate language bytecode;

create a root node to represent the decomposed assembly;

create one or more internal nodes to represent the one or more components that comprise or reference the intermediate language bytecode;

create a first set of one or more leaf nodes that comprises or references the intermediate language bytecode;

create a second set of one or more leaf nodes that comprise metadata describing the intermediate language bytecode;

link the root node, the one or more internal nodes, and the first set and second set of one or more leaf nodes to construct an object tree to represent the hierarchical relationships among the one or more components that comprise or reference the intermediate language bytecode;

hash the intermediate language bytecode in or referenced by the first set of one or more leaf nodes in the object tree to produce one or more digest values that represent hashed contents of the first set of one or more leaf nodes; and track the one or more digest values to determine whether the intermediate language bytecode in the assembly has changed.

24. The system of claim 23, wherein the one or more processing devices are further configured to:

assign one or more tracking values to the root node and the one or more internal nodes in the object tree based on the hierarchical relationships represented in the object tree and the one or more digest values that represent the hashed contents of the first set of one or more leaf nodes;

detect the one or more changes associated with the decomposed assembly if the one or more digest values of the first set of one or more leaf nodes have changed; and identify where the decomposed assembly has changed based on the one or more digest values and the one or more tracking values.

25. The system of claim 23, wherein the one or more internal nodes further represent one or more resources associated with the decomposed assembly and the second set of one or more leaf nodes further represent metadata that describes the one or more resources associated with the decomposed assembly.

26. The system of claim 25, wherein the one or more processing devices are further configured to:

assign tracking values to the root node and the one or more internal nodes in the object tree based on the hierarchical relationships represented in the object tree and the one or more digest values that represent the hashed contents associated with the first set of one or more leaf nodes; and detect the one or more changes associated with the decomposed assembly if the tracking values assigned to the root node or the one or more internal nodes have changed.

27. The system of claim 23, wherein the one or more processing devices are configured to use a cryptographic hash function to hash the contents associated with the first set of one or more leaf nodes and produce the one or more digest values that represent the hashed contents associated with the first set of one or more leaf nodes.

28. The system of claim 23, wherein the intermediate language bytecode in the received assembly includes Common Intermediate Language bytecode or translated source code that can be compiled into native machine code executable in a runtime environment.

29. The system of claim 23, wherein the one or more internal nodes represent one or more modules, one or more types contained within the one or more modules, or one or more methods contained within the one or more types, and wherein the one or more leaf nodes comprise intermediate language bytecode used by the one or more methods, types, or modules.

30. The system of claim 29, wherein the root node, the one or more internal nodes, and the first set and second set of one or more leaf nodes linked in the object tree further represent the hierarchical relationships among the decomposed assembly, the metadata, the intermediate language bytecode, and the one or more modules, the one or more types, or the one or more methods.

31. The system of claim 30, wherein the decomposed assembly further comprises one or more resources and the one or more internal nodes further represent the one or more resources in the decomposed assembly.

32. The system of claim 26, wherein the one or more processing devices are further configured to:
    determine, for each internal node having a leaf node, whether content of the leaf node of the internal node has changed, wherein the determining is based on a digest value produced from hashing content of the leaf node;
    assign, to each internal node having a leaf node, a tracking value indicative of change if content of the leaf node was determined to have changed;
    assign, to the root node, the tracking value indicative of change if one of the one or more internal nodes was assigned the tracking value indicative of change.

33. The system of claim 29, wherein the one or more processing devices are further configured to:
    decompose the intermediate language bytecode in the one or more leaf nodes into a call graph associated with the one or more methods that use the intermediate language bytecode;
    create a sub-tree to represent the call graph associated with the one or more methods that comprise the decomposed intermediate language bytecode; and
    link the first set of one or more leaf nodes that comprise the decomposed intermediate language bytecode to the sub-tree created to represent the call graph associated with the one or more methods.

* * * * *